Patented Aug. 10, 1943

2,326,222

UNITED STATES PATENT OFFICE 2,326,222

ARYL-SUBSTITUTED HYDROGENATED CYCLIC COMPOUND AND THE PROCESS OF PRODUCING SAME

Heinrich Hopff and Wilhelm Rapp, Ludwigshafen-on-the-Rhine, and Heinrich Rinke, Leverkusen-Schlebusch, Germany; vested in the Alien Property Custodian No Drawing. Application March 25, 1941, Serial No. 385,136. In Germany January 4, 1940

6 Claims. (Cl. 260—465)

The present invention relates to new aryl-substituted hydrogenated cyclic compounds and the process of producing same.

It is known that dienes may be added onto compounds containing activated multiple carbon linkages with the formation of partially hydrogenated cyclic compounds which compounds are known under the name "diene adducts." As dienes there may be used, for example, butadiene, isoprene, dimethylbutadiene, β-chlorbutadiene, cyclopentadiene and cyclohexadiene. As compounds containing activated multiple carbon linkages there may be mentioned maleic acid, its esters, amides and imides, acroleine, vinylmethylketone, crotonaldehyde, cinnamicaldehyde, cinnamic acid esters, acrylic acid and its homologues, esters and nitriles, vinyl chloride, vinyl esters and ethers, vinyl pyridine and vinyl furane, nitripropene, omega-nitrostyrene, acetylenedicarboxylic acid esters, quinones, as for example benzoquinone and naphthoquinone and monoas well as divinyl-acetylene.

We have now found that valuable new aryl-substituted hydrogenated cyclic compounds are obtained by reacting partially hydrogenated cyclic diene adducts of the above-identified type with aromatic hydrocarbons in the presence of catalysts of the Friedel-Crafts type.

Among aromatic hydrocarbons suitable for this reaction we may mention, for example, benzene, toluene, xylene, naphthalene, alkylnaphthalenes, acenaphthene, diphenyl, terphenyl and their alkyl derivates; the halogen-substitution products of the aromatic hydrocarbons may also be used, as, for example, chlorobenzene.

Suitable catalysts are, for example, anhydrous aluminium chloride or aluminium bromide, furthermore anhydrous ferric chloride, stannic chloride, zinc chloride, beryllium chloride and boron fluoride. The reaction may be carried out even at room temperature or below, reaction temperatures of 30 to 70° C. being, however, preferred. Higher temperatures up to the boiling point of the reaction mixture may be employed, if so desired.

When carrying out the reaction by using a liquid aromatic hydrocarbon as one reaction compound, it is advantageous to employ it in excess so that it may function at the same time as a solvent. When using solid higher molecular aromatic hydrocarbons, it is preferable to dissolve them in a solvent such as carbon disulphide, cyclohexane or gasoline. When the "diene adduct" is employed in excess over the aromatic hydrocarbon the latter may react several times, preferably twice, with the "diene adduct."

The new products obtainable by the present invention may be used as softeners for plastics and as intermediate products for dyes, textile assistants and plastics.

The following examples serve to illustrate how the present invention may be carried out in practice, but the invention is not restricted to these examples. The parts are by weight.

*Example 1*

500 parts of benzene are mixed with 130 parts of anhydrous aluminium chloride, whereupon a solution of 62 parts Δ4-tetrahydroacetophenone (prepared by adding butadiene onto vinylmethylketone) in 30 parts of benzene is dropped into this mixture at a temperature of from 35–40° C. while stirring. The mixture is kept for about 4 to 5 hours at a temperature of from 40–50° C. The reaction mixture is then poured on ice and rendered acid to congo by means of hydrochloric acid. The benzene layer is then separated off, washed with water until it is neutral and dried with anhydrous sodium sulphate. After evaporating the solvent under reduced pressure, the residue is distilled, phenylhexahydroacetophenone boiling at from 167–168° C. under a pressure of 11 millimeters (mercury gauge) being obtained in a practically quantitative yield. The product is a mixture of 3- and 4-phenylhexahydroacetophenone.

*Example 2*

A solution of 40.5 parts of Δ4-tetrahydrobenzonitrile (obtainable by adding acrylic nitrile onto butadiene) in 20 parts of benzene is allowed to drop into a suspension of 104 parts of anhydrous aluminium chloride in 400 parts of benzene at a temperature of from 45–50° C. while stirring vigorously. The temperature is kept at 50° C. for about 4 hours. The reaction mixture is worked up according to Example 1. Phenylhexahydrobenzonitrile boiling from 168–169° C. under a pressure of 11 millimeters (mercury gauge) is thus obtained in a practically theoretic yield.

*Example 3*

52 parts of anhydrous aluminium chloride are poured into 400 parts of benzene, whereupon a mixture of 26 parts of Δ4-tetrahydrobenzoic acid (obtainable by adding butadiene onto acrylic acid) and 30 parts of benzene are added in portions while vigorously stirring. The mixture is then kept for about 4 hours at a temperature of from 35–40° C. The reaction product is poured on ice, rendered strongly acid by means of hydrochloric acid and the benzene layer is separated off. The latter is shaken with 250 parts of caustic soda solution of 10 per cent strength. By acidifying the aqueous liquor phenylhexahydrobenzoic acid is separated off in a crystalline form.

After being recrystallized from acetic acid of 50 per cent strength, the acid has a melting point of from 90 to 95° C. In this acid the phenyl radicle presumably enters in either the 3- or 4-position.

*Example 4*

85 parts of Δ4-tetrahydrophthalic acid (obtainable by adding butadiene onto maleic acid) are introduced by portions into a mixture of 500 parts of benzene and 130 parts of anhydrous aluminium chloride at a temperature of 40 to 50° C. while vigorously stirring. After the reaction has ceased, the reaction mixture is cooled by adding ice and rendered strongly acid by means of hydrochloric acid. The crystalline reaction product is filtered off by suction. The benzene layer also still contains a slight proportion of the reaction product formed; it is obtained by evaporating the solvent and united with the main quantity of the reaction product. The crude product is purified by dissolving it in dilute caustic soda solution and precipitating with hydrochloric acid. The phenylhexahydrophthalic acid so obtained in an excellent yield has a melting point of from 190 to 193° C.

*Example 5*

A solution of 45 parts of Δ4-tetrahydrophthalic acid diethyl ester (obtainable by adding butadiene onto maleic acid diethylester) in 50 parts of benzene is slowly dropped into a mixture of 52 parts of anhydrous aluminium chloride and 400 parts of benzene at a temperature of 50° C. while vigorously stirring. The temperature is kept at 50° C. for some hours. After adding ice hydrochloric acid is added until a strongly acid reaction has been set up whereupon the benzene layer is separated off. After washing it with dilute soda solution and water, the benzene is evaporated under reduced pressure. The phenylhexahydrophthalic acid diethyl ester thus obtained in a good yield has a boiling point of from 185 to 186° C. under a pressure of 0.4 millimeter (mercury gauge).

*Example 6*

260 parts of anhydrous aluminium chloride are poured into a solution of 154 parts of diphenyl in 200 parts of carbon disulphide at room temperature while stirring. 130 parts of Δ4-tetrahydrobenzoic acid (obtainable by adding butadiene onto acrylic acid) are then added by portions at a temperature of from 30–40° C. The reaction mass is then stirred at from 30–40° C. for 5 hours. After cooling the product is poured on ice, acidified with hydrochloric acid and the carbon disulphide blown off with steam. The remainder is taken up in dilute caustic soda solution, the solution is filtered and the diphenylylhexahydrobenzoic acid thus formed is precipitated by means of dilute hydrochloric acid. After being recrystallized from dilute acetic acid it has a melting point of 217° C.

*Example 7*

266 parts of anhydrous aluminium chloride are poured by portions into a mixture of 214 parts of tetrahydrobenzonitrile (obtainable by adding butadiene onto acrylic nitrile) and 87 parts of benzene at a temperature of from 25 to 30° C. while vigorously stirring. The mixture is then heated at 50° C. for 3 hours. After cooling the mass is mixed with ice water and strongly acidified with hydrochloric acid. The reaction product is taken up in ether, the ethereal solution washed with water until neutral and dried with anhydrous sodium sulphate. After evaporating the solvent the bis-(cyanocyclohexyl)-benzene which is an oil boiling at between 237 and 239° C. under a pressure of 1 millimeter (mercury gauge) is obtained in a very good yield.

*Example 8*

266 parts of anhydrous aluminium chloride are poured by portions into a mixture of 248 parts of tetrahydroacetophenone (obtainable by adding butadiene onto vinylmethylketone) and 78 parts of benzene at a temperature of from 45 to 55° C. while stirring. After stirring for 2 to 3 hours at the said temperature the viscous melt is mixed with ice, acidified with hydrochloric acid and shaken with ether. The ethereal solution is washed with anhydrous sodium sulphate until neutral and dried. After evaporating the solvent an oil is obtained which boils at from 200 to 220° C. under a pressure of 0.5 millimeter (mercury gauge) and consists of a mixture of isomeric bis-(acetylcyclohexyl)-benzenes.

*Example 9*

266 parts of anhydrous aluminium chloride are poured by portions into a mixture of 252 parts of tetrahydrobenzoic acid (obtainable by adding butadiene onto acrylic acid) and 78 parts of benzene at a temperature of from 65 to 70° C. while vigorously stirring. After about 4 hours the viscous melt is mixed with ice water. After acidifying with hydrochloric acid the crude product is filtered off by suction. The acid mixture formed consisting of isomeric carboxylic acids of the general constitution of bis-(carboxycyclohexyl)-benzene may be purified by dissolving it in caustic soda solution and precipitating it with dilute hydrochloric acid. After being recrystallized from glacial acetic acid the product has a decomposition point of from 265 to 270° C. It is obtained in a very good yield.

*Example 10*

A mixture of 370 parts of diphenyl and 540 parts of tetrahydrobenzonitrile (obtainable by adding butadiene onto acrylic nitrile) is added by portions to 660 parts of anhydrous aluminium chloride at between 50 and 55° C. The reaction mixture is kept at this temperature for about 3 hours. The viscous melt thus obtained is then poured on ice, the oily layer separating off dissolved in benzene and washed with water until neutral. After drying the solution with sodium sulphate, the solvent is removed and the residue distilled in vacuo. Diphenylhexahydrobenzonitrile boiling at between 208 and 214° C. under a pressure of 2.5 millimeters (mercury gauge) is thus obtained in an excellent yield.

*Example 11*

54 parts of tetrahydrobenzonitrile (obtainable by adding butadiene onto acrylic nitrile) are dropped in the course of one hour into a mixture of 100 parts of toluene and 66 parts of anhydrous aluminium chloride warmed to a temperature of from 40 to 50° C. After all of the nitrile has been added, the reaction mixture is kept at the said temperature for one hour. After cooling the mixture is poured on ice, rendered acid to congo by means of hydrochloric acid and the organic layer separated from the aqueous one. After washing with water the solution is dried with sodium sulphate. The excess of toluene is evaporated and the residue distilled under reduced pressure. The paramethylphenylhexahydrobenzonitrile obtained boils at between 169 and 170° C. under a pressure of 7 millimeters (mercury gauge).

*Example 12*

200 parts of toluene are mixed with 132 parts of anhydrous aluminium chloride, whereupon 126 parts of tetrahydrobenzoic acid (obtainable by adding butadiene onto acrylic acid) are added by portions at from 50 to 60° C. After 2 hours' reaction the mixture is worked up according to Example 3. The paramethylphenylhexahydrobenzoic acid obtained has a boiling point of between 225 and 232° C. under a pressure of 1.5 millimeters (mercury gauge).

*Example 13*

124 parts of tetrahydroacetophenone (obtainable by adding butadiene onto vinylmethylketone) are added in the course of 2 hours at a temperature of from 50 to 55° C. to a mixture of 220 parts of ethylbenzene and 133 parts anhydrous aluminium chloride. After a further 2 hours the reaction mixture is worked up in the manner described in Example 1. Para-ethylphenylhexahydroacetophenone boiling at between 155 and 160° C. under a pressure of 1 millimeter (mercury gauge) is obtained in an excellent yield.

*Example 14*

220 parts of ethylbenzene are admixed with 133 parts of anhydrous aluminium chloride and 107 parts of tetrahydrobenzonitrile (obtainable by adding butadiene onto acrylic nitrile) are caused to react with this mixture for 2 hours at from 50 to 60° C. After about one further hour the reaction mixture is worked up as described in Example 1. Para-ethylphenylhexahydrobenzonitrile boiling at between 175 and 185° C. under a pressure of 4 millimeters (mercury gauge) is obtained in a practically theoretical yield.

What we claim is:

1. A process of producing aromatic and halogenated aromatic hydrocarbons disubstituted in the nucleus by a partially hydrogenated cyclic radical containing a functional group in the ring which comprises reacting two mols of a partially hydrogenated cyclic compound which is the diene addition product of a diolefin and a monomeric vinyl compound with one mol of a member of the group consisting of aromatic and halogenated aromatic hydrocarbons in the presence of a catalyst of the Friedel-Crafts type.

2. The process as defined in claim 1, in which the diolefin is butadiene.

3. A compound of the group consisting of aromatic and halogenated aromatic hydrocarbons disubstituted in the nucleus by a partially hydrogenated cyclic radical containing a functional group in the ring, said compound being obtained by reacting two mols of a partially hydrogenated cyclic compound which is the diene addition product of a diolefin and a monomeric vinyl compound with one mol of a member of the group consisting of aromatic and halogenated aromatic hydrocarbons in the presence of a catalyst of the Friedel-Crafts type.

4. A compound as defined in claim 3, wherein the diolefin from which the partially hydrogenated cyclic radical is derived is butadiene.

5. A process of producing bis(cyanocyclohexyl)-benzene which comprises reacting two molecular proportions of tetrahydrobenzonitrile with one molecular proportion of benzene in the presence of a catalyst of the Friedel-Crafts type.

6. As a new compound bis-(cyanocyclohexyl)-benzene.

HEINRICH HOPFF.
WILHELM RAPP.
HEINRICH RINKE.